(12) United States Patent
Stein et al.

(10) Patent No.: US 7,581,528 B2
(45) Date of Patent: Sep. 1, 2009

(54) CONTROL STRATEGY FOR ENGINE EMPLOYNG MULTIPLE INJECTION TYPES

(75) Inventors: Robert A. Stein, Saline, MI (US);
Thomas G. Leone, Ypsilanti, MI (US);
Jeff Lyjak, Ann Arbor, MI (US);
Michael Shelby, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 88 days.

(21) Appl. No.: 11/378,671

(22) Filed: Mar. 17, 2006

(65) Prior Publication Data

US 2007/0215110 A1 Sep. 20, 2007

(51) Int. Cl.
*F02M 25/14* (2006.01)
(52) U.S. Cl. .................. 123/431; 123/575; 123/406.31; 123/304
(58) Field of Classification Search .................. 123/1 A, 123/304, 431, 690, 479, 575–578, 406.31, 123/406.32
See application file for complete search history.

(56) References Cited

U.S. PATENT DOCUMENTS

| | | | |
|---|---|---|---|
| 2,221,405 A | 11/1940 | Nallinger | |
| 3,589,348 A | 6/1971 | Reichhelm | |
| 3,794,000 A | 2/1974 | Hodgkinson | |
| 4,031,864 A | 6/1977 | Crothers | |
| 4,136,652 A | 1/1979 | Lee | |
| 4,205,650 A | 6/1980 | Szwarcbier | |
| 4,256,075 A | 3/1981 | Fukui et al. | |
| 4,311,118 A | 1/1982 | Slagle | |
| 4,325,329 A | 4/1982 | Taylor | |
| 4,402,296 A | 9/1983 | Schwarz | |
| 4,411,243 A | 10/1983 | Hardenberg et al. | |
| 4,480,616 A | 11/1984 | Takeda | |
| 4,489,596 A | 12/1984 | Linder et al. | |
| 4,499,885 A * | 2/1985 | Weissenbach et al. | 123/525 |
| 4,502,453 A | 3/1985 | Kabasin et al. | |
| 4,590,904 A | 5/1986 | Wannenwetsch | |
| 4,648,367 A | 3/1987 | Gillbrand et al. | |

(Continued)

FOREIGN PATENT DOCUMENTS

EP 1057988 1/2006

(Continued)

OTHER PUBLICATIONS

Stephen Russ, "A Review of the Effect of Engine Operating Conditions on Borderline Knock", SAE Technical Paper Series 960497, Feb. 26-29, 1996.

(Continued)

*Primary Examiner*—Erick Solis
(74) *Attorney, Agent, or Firm*—Allan J. Lippa; Alleman Hall McCoy Russell & Tuttle LLP

(57) ABSTRACT

A system for an engine, comprising a cylinder, a first injection subsystem for injecting a first substance into the cylinder, a second injection subsystem for injecting a second substance into the cylinder, and an electronic engine controller configured to control a plurality of operating parameters of the engine, where the electronic engine controller is configured to cause variation of at least one of the operating parameters in response to a shortfall condition of the second injection subsystem.

28 Claims, 8 Drawing Sheets

U.S. PATENT DOCUMENTS

| | | | |
|---|---|---|---|
| 4,706,630 A | 11/1987 | Wineland et al. | |
| 4,810,929 A | 3/1989 | Strumbos | |
| 4,817,576 A | 4/1989 | Abe et al. | |
| 4,930,537 A | 6/1990 | Farmer | |
| 4,945,881 A | 8/1990 | Gonze et al. | |
| 4,962,789 A | 10/1990 | Benscoter | |
| 4,993,386 A | 2/1991 | Ozasa et al. | |
| 4,998,518 A | 3/1991 | Mitsumoto | |
| 5,017,826 A | 5/1991 | Oshima et al. | |
| 5,018,483 A | 5/1991 | Kashima et al. | |
| 5,044,331 A | 9/1991 | Suga et al. | |
| 5,044,344 A | 9/1991 | Tuckey et al. | |
| 5,056,490 A | 10/1991 | Kashima | |
| 5,056,494 A | 10/1991 | Kayanuma | |
| 5,111,795 A | 5/1992 | Thompson | |
| 5,131,228 A | 7/1992 | Mochizuki et al. | |
| 5,188,087 A | 2/1993 | Saito | |
| 5,204,630 A | 4/1993 | Seitz et al. | |
| 5,230,309 A | 7/1993 | Suga et al. | |
| 5,233,944 A | 8/1993 | Mochizuki | |
| 5,335,637 A | 8/1994 | Davis et al. | |
| 5,336,396 A | 8/1994 | Shetley | |
| 5,357,908 A | 10/1994 | Sung et al. | |
| 5,360,034 A | 11/1994 | Der Manuelian | |
| 5,408,979 A | 4/1995 | Backlund et al. | |
| 5,417,239 A | 5/1995 | Ford | |
| 5,469,830 A | 11/1995 | Gonzlaez | |
| 5,477,836 A | 12/1995 | Hyodo et al. | |
| 5,508,582 A | 4/1996 | Sugimoto et al. | |
| 5,515,280 A * | 5/1996 | Suzuki | 701/29 |
| 5,560,344 A * | 10/1996 | Chan | 123/515 |
| 5,565,157 A | 10/1996 | Sugimoto et al. | |
| 5,694,908 A | 12/1997 | Hsu | |
| 5,740,784 A | 4/1998 | McKinney | |
| 5,782,092 A | 7/1998 | Schultalbers et al. | |
| 5,806,500 A | 9/1998 | Fargo et al. | |
| 5,875,743 A | 3/1999 | Dickey | |
| 5,921,222 A | 7/1999 | Freeland | |
| 6,112,705 A | 9/2000 | Nakayama et al. | |
| 6,112,725 A | 9/2000 | McKinney | |
| 6,119,637 A | 9/2000 | Matthews et al. | |
| 6,189,516 B1 | 2/2001 | Hei Ma | |
| 6,229,253 B1 | 5/2001 | Iwata et al. | |
| 6,318,083 B1 | 11/2001 | Machida et al. | |
| 6,382,225 B1 | 5/2002 | Tipton | |
| 6,467,470 B1 * | 10/2002 | Carlsson et al. | 123/576 |
| 6,494,192 B1 | 12/2002 | Capshaw et al. | |
| 6,505,579 B1 | 1/2003 | Lee | |
| 6,553,974 B1 | 4/2003 | Wickman et al. | |
| 6,617,769 B2 | 9/2003 | Suzuki | |
| 6,622,664 B2 | 9/2003 | Holder et al. | |
| 6,622,690 B2 | 9/2003 | Ando et al. | |
| 6,698,387 B1 | 3/2004 | McFarland et al. | |
| 6,711,893 B2 | 3/2004 | Ueda et al. | |
| 6,792,966 B2 | 9/2004 | Harvey | |
| 6,805,107 B2 * | 10/2004 | Vinyard | 123/525 |
| 6,845,616 B2 | 1/2005 | Jauss | |
| 6,928,983 B2 | 8/2005 | Mashiki | |
| 6,951,202 B2 | 10/2005 | Oda | |
| 6,959,693 B2 | 11/2005 | Oda | |
| 6,972,093 B2 | 12/2005 | Partridge et al. | |
| 6,978,762 B2 | 12/2005 | Mori | |
| 6,988,485 B2 | 1/2006 | Ichise et al. | |
| 6,990,956 B2 | 1/2006 | Niimi | |
| 7,055,500 B2 | 6/2006 | Miyashita et al. | |
| 7,082,926 B2 | 8/2006 | Sadakane et al. | |
| 7,159,568 B1 | 1/2007 | Lewis et al. | |
| 7,178,503 B1 | 2/2007 | Brehob | |
| 7,225,787 B2 | 6/2007 | Bromberg et al. | |
| 7,255,080 B1 | 8/2007 | Leone | |
| 7,261,064 B2 | 8/2007 | Bhaisora et al. | |
| 7,278,396 B2 | 10/2007 | Leone et al. | |
| 7,287,492 B2 | 10/2007 | Leone et al. | |
| 7,287,509 B1 | 10/2007 | Brehob | |
| 7,293,552 B2 | 11/2007 | Leone et al. | |
| 7,426,908 B2 | 9/2008 | Brehob | |
| 7,428,895 B2 | 9/2008 | Leone et al. | |
| 2001/0035215 A1 | 11/2001 | Tipton et al. | |
| 2003/0089337 A1 | 5/2003 | Cohn et al. | |
| 2003/0127072 A1 | 7/2003 | Gmelin et al. | |
| 2003/0221660 A1 | 12/2003 | Surnilla et al. | |
| 2004/0035395 A1 | 2/2004 | Heywood et al. | |
| 2004/0065274 A1 | 4/2004 | Cohn et al. | |
| 2004/0083717 A1 | 5/2004 | Zhu et al. | |
| 2004/0261763 A1 | 12/2004 | Hashimoto et al. | |
| 2005/0051135 A1 | 3/2005 | Tomada et al. | |
| 2005/0066939 A1 | 3/2005 | Shimada et al. | |
| 2005/0097888 A1 | 5/2005 | Miyashita | |
| 2005/0103285 A1 | 5/2005 | Oda | |
| 2005/0109316 A1 | 5/2005 | Oda | |
| 2005/0109319 A1 | 5/2005 | Oda | |
| 2005/0155577 A1 | 7/2005 | Ichise et al. | |
| 2005/0155578 A1 | 7/2005 | Ichise et al. | |
| 2005/0166896 A1 | 8/2005 | Sadakane | |
| 2005/0172931 A1 | 8/2005 | Mori | |
| 2005/0178356 A1 | 8/2005 | Shibagaki | |
| 2005/0178360 A1 | 8/2005 | Satou | |
| 2005/0183698 A1 | 8/2005 | Yonezawa | |
| 2005/0274353 A1 | 12/2005 | Okubo et al. | |
| 2006/0016429 A1 | 1/2006 | Mashiki | |
| 2006/0075991 A1 | 4/2006 | Heywood et al. | |
| 2006/0090732 A1 | 5/2006 | Shibagaki | |
| 2006/0102136 A1 | 5/2006 | Bromberg et al. | |
| 2006/0102145 A1 | 5/2006 | Cohn et al. | |
| 2006/0102146 A1 | 5/2006 | Cohn et al. | |
| 2006/0180099 A1 | 8/2006 | Aimoto et al. | |
| 2006/0191727 A1 | 8/2006 | Usami et al. | |
| 2007/0028861 A1 | 2/2007 | Kamio et al. | |
| 2007/0028905 A1 | 2/2007 | Shinagawa et al. | |
| 2007/0034192 A1 | 2/2007 | Kamio et al. | |
| 2007/0119391 A1 | 5/2007 | Fried et al. | |
| 2007/0119392 A1 | 5/2007 | Leone et al. | |
| 2007/0119394 A1 | 5/2007 | Leone | |
| 2007/0119411 A1 | 5/2007 | Kerns | |
| 2007/0119412 A1 | 5/2007 | Leone et al. | |
| 2007/0119413 A1 | 5/2007 | Lewis et al. | |
| 2007/0119414 A1 | 5/2007 | Leone et al. | |
| 2007/0119415 A1 | 5/2007 | Lewis et al. | |
| 2007/0119416 A1 | 5/2007 | Boyarski | |
| 2007/0119421 A1 | 5/2007 | Lewis et al. | |
| 2007/0119422 A1 | 5/2007 | Lewis et al. | |
| 2007/0119425 A1 | 5/2007 | Lewis et al. | |
| 2007/0204813 A1 | 9/2007 | Arai et al. | |
| 2007/0215069 A1 | 9/2007 | Leone | |
| 2007/0215071 A1 | 9/2007 | Dearth et al. | |
| 2007/0215072 A1 | 9/2007 | Dearth et al. | |
| 2007/0215101 A1 | 9/2007 | Russell et al. | |
| 2007/0215102 A1 | 9/2007 | Russell et al. | |
| 2007/0215104 A1 | 9/2007 | Hahn | |
| 2007/0215111 A1 | 9/2007 | Surnilla | |
| 2007/0215125 A1 | 9/2007 | Dearth et al. | |
| 2007/0215127 A1 | 9/2007 | Dearth et al. | |
| 2007/0215130 A1 | 9/2007 | Shelby et al. | |
| 2007/0219679 A1 | 9/2007 | Leone | |
| 2007/0221163 A1 | 9/2007 | Kamio | |
| 2007/0234976 A1 | 10/2007 | Dearth et al. | |
| 2007/0289573 A1 | 12/2007 | Leone et al. | |
| 2007/0295307 A1 | 12/2007 | Kerns | |
| 2008/0017171 A1 | 1/2008 | Stein et al. | |
| 2008/0035106 A1 | 2/2008 | Stein | |
| 2008/0046161 A1 | 2/2008 | Blumberg et al. | |
| 2008/0053399 A1 | 3/2008 | Bromberg et al. | |
| 2008/0127933 A1 | 6/2008 | Blumberg et al. | |
| 2008/0156303 A1 | 7/2008 | Bromberg et al. | |

| | | |
|---|---|---|
| 2008/0173278 A1 | 7/2008 | Bromberg et al. |

FOREIGN PATENT DOCUMENTS

| | | |
|---|---|---|
| JP | 61065066 | 9/1984 |
| JP | 2007/056754 | 8/2005 |
| WO | WO 2004/097198 | 11/2004 |
| WO | WO 2006/055540 | 5/2006 |
| WO | WO 2007/106354 | 9/2007 |
| WO | WO 2007/106416 | 9/2007 |

OTHER PUBLICATIONS

S. Brusca et al., "Water Injection in IC-SI Engines to Control Detonation and to Reduce Pollutant Emissions", SAE Technical Paper No. 2003-01-1912, May 19-22, 2003.

D.R. Cohn et al., "Direct Injection Ethanol Boosted Gasoline Engines: Biofuel Leveraging for Cost Effective Reduction of Oil Dependence and CO2 Emissions", Mar. 15, 2005, Massachusetts Institute of Technology.

L. Bromberg et al., "Calculations of Knock Suppression in Highly Turbocharged Gasoline/Ethanol Engines Using Direct Ethanol Injection", Jul. 7, 2005, Massachusetts Institute of Technology.

Hunter, M. Park, "1962 Oldsmobile Jetfire," originally appeared in Special Interest Autos, Apr. 1996, http://www.tctc.com/~park/mph/pageCLIP/page62JET/62jet.htm, Nov. 7, 2006.

Vance, Bill, "Turbocharger Boosted Engine's Efficiency: Developed to maintain high-altitude performance," for the Calgary Herald Edmonton, http://www.ucalgary.ca/~csimpson/Articles/JetFire.html, Nov. 7, 2006.

Pursifull, R.D. et al., "Fuel Rail Assembly Including Fuel Separation Membrane", U.S. Appl. No. 11/962,683, filed Dec. 21, 2007, 43 pages.

Pursifull, R.D., "On-Board Fuel Vapor Separation for Multi-Fuel Vehicle", U.S. Appl. No. 11/955,246, filed Dec. 12, 2007, 44 pages.

Zubeck, M.W., "Directly Injected Internal Combustion Engine System", U.S. Appl. No. 11/871,496, filed Oct. 12, 2007, 36 pages.

* cited by examiner

CONTROL STRATEGY FOR ENGINE EMPLOYNG MULTIPLE INJECTION TYPES

BACKGROUND AND SUMMARY

Engines may use various forms of fuel delivery to provide a desired amount of fuel for combustion in each cylinder. One type of fuel delivery uses a port injector for each cylinder to deliver fuel to respective cylinders. Still another type of fuel delivery uses a direct injector for each cylinder.

Engines have also been described using more than one injector to provide fuel to a single cylinder in an attempt to improve engine performance. Specifically, in US 2005/0155578 an engine is described using a port fuel injector and a direct injector in each cylinder of the engine.

Another approach utilizing multiple injection locations for different fuel types is described in the papers titled "Calculations of Knock Suppression in Highly Turbocharged Gasoline/Ethanol Engines Using Direct Ethanol Injection" and "Direct Injection Ethanol Boosted Gasoline Engine Biofuel Leveraging for Cost Effective Reduction of Oil Dependence and CO2 Emissions" by Heywood et al. Specifically, the Heywood et al. papers describe directly injecting ethanol to improve charge cooling effects, while relying on port injected gasoline for providing the majority of combusted fuel over a drive cycle.

The inventors have recognized various issues associated with such systems. Injection and other control strategies in these systems are predicated on availability of a knock-suppressing agent such as ethanol, and effective delivery of that agent into the combustion chamber. However, deficiencies in the ethanol delivery, such as a malfunction in the ethanol injector or a depleted or low ethanol supply, can result in engine knock, elevated exhaust temperatures, accelerated component wear, and/or other potentially undesirable effects.

Thus, in one approach, a system is provided for an engine, the system having a cylinder and first and second fuel injection subsystems. The first fuel injection subsystem is configured to inject a first fuel into the cylinder, and the second fuel injection subsystem is configured to inject a second fuel into the cylinder. The system also includes an electronic engine controller configured to control a plurality of operating parameters of the engine. The electronic engine controller is configured to cause variation of at least one of the operating parameters in response to a shortfall condition of the second fuel injection system. The shortfall condition may include detection of a condition indicative of a current or potential future deficiency in the second fuel injection subsystem, which may be configured to provide a knock-suppressing agent such as ethanol into the cylinder. Thus, the detected deficiency in the knock-suppressing agent is accounted for in the control strategies of the engine, so as to maintain knock-suppression and other desired performance characteristics.

DETAILED DESCRIPTION

Figure 1:
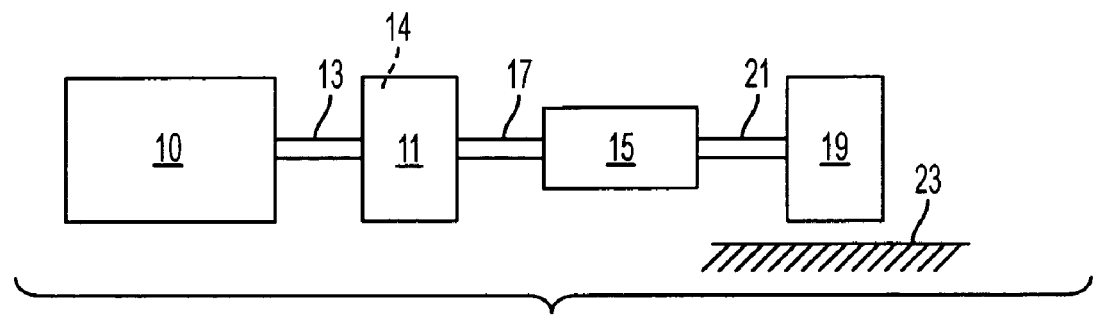
FIG. 1 is a block diagram of a vehicle illustrating various components of the powertrain system.
Figure 3:
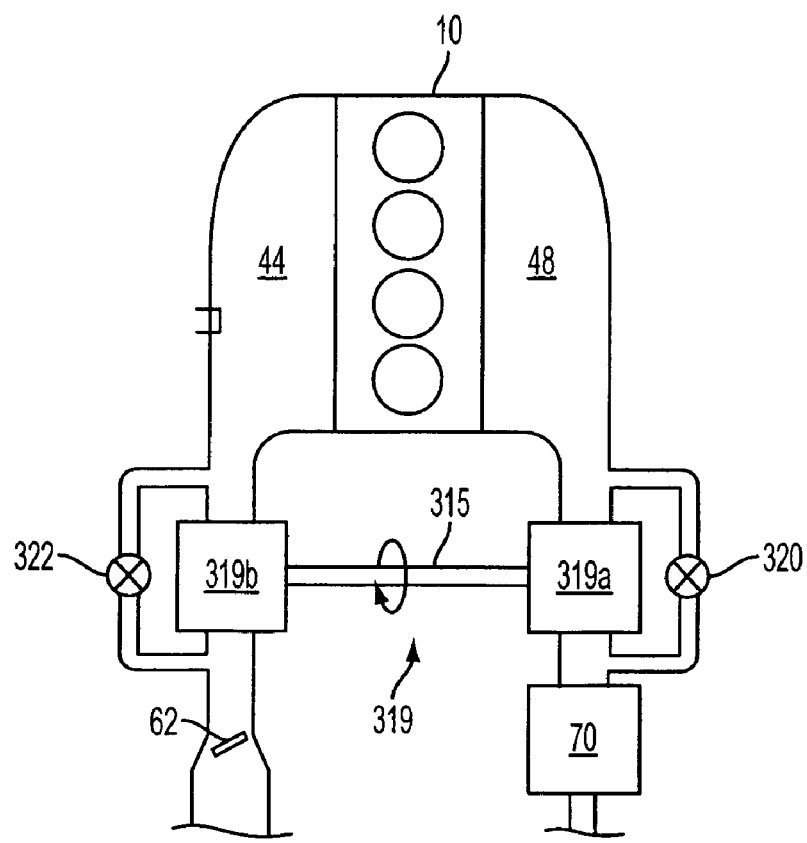
FIG. 3 shows an engine with a turbocharger.
Figure 2:
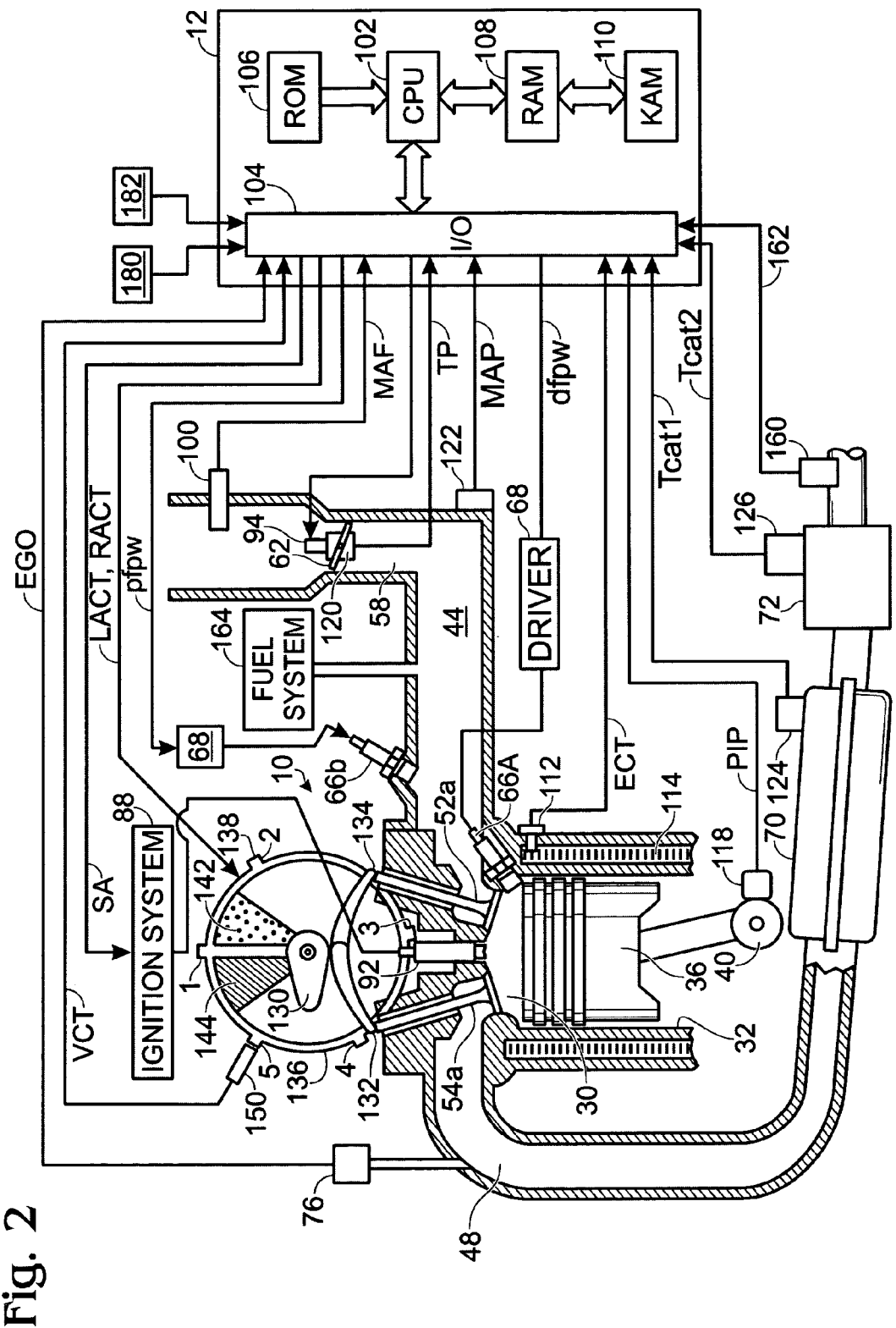
FIG. 2 shows a partial engine view.

Referring to FIG. 1, in this example, internal combustion engine 10, further described herein with particular reference to FIGS. 2 and 3, is shown coupled to torque converter 11 via crankshaft 13. Torque converter 11 is also coupled to transmission 15 via turbine shaft 17. Torque converter 11 has a bypass, or lock-up clutch 14 which can be engaged, disengaged, or partially engaged. When the clutch is either disengaged or partially engaged, the torque converter is said to be in an unlocked state. The lock-up clutch 14 can be actuated electrically, hydraulically, or electro-hydraulically, for example. The lock-up clutch 14 receives a control signal (not shown) from the controller, described in more detail below. The control signal may be a pulse width modulated signal to engage, partially engage, and disengage, the clutch based on engine, vehicle, and/or transmission operating conditions. Turbine shaft 17 is also known as transmission input shaft. Transmission 15 comprises an electronically controlled transmission with a plurality of selectable discrete gear ratios. Transmission 15 also comprises various other gears, such as, for example, a final drive ratio (not shown). Transmission 15 is also coupled to tire 19 via axle 21. Tire 19 interfaces the vehicle (not shown) to the road 23. Note that in one example embodiment, this powertrain is coupled in a passenger vehicle that travels on the road.

In an alternative embodiment, a manual transmission operated by a driver with a clutch may be used. Further, various types of automatic transmissions may be used, such as a Continuously Variable Transmission (CVT), Infinitely Variable Transmission (IVT), Automatically Shifted Manual (ASM), Dual Clutch Layshaft Automatic, etc.

FIG. 2 shows one cylinder of a multi-cylinder engine, as well as the intake and exhaust path connected to that cylinder. In the embodiment shown in FIG. 2, engine 10 is capable of using two different fuels, and/or two different injectors in one example. For example, engine 10 may use gasoline and an alcohol containing fuel such as ethanol, methanol, a mixture of gasoline and ethanol (e.g., E85 which is approximately 85% ethanol and 15% gasoline), a mixture of gasoline and methanol (e.g., M85 which is approximately 85% methanol and 15% gas), etc. In another example, two fuel systems are used, but each uses the same fuel, such as gasoline. In still another embodiment, a single injector (such as a direct injector) may be used to inject a mixture of gasoline and such an alcohol based fuel, where the ratio of the two fuel quantities in the mixture may be adjusted by controller 12 via a mixing valve, for example. In still another example, two different injectors for each cylinder are used, such as port and direct injectors. In even another embodiment, different sized port injectors, in addition to different locations and/or spray patterns and/or different fuels, may be used.

As will be described in more detail below, various advantageous results may be obtained by various of the above systems. For example, when using both gasoline and a fuel having alcohol (e.g., ethanol), it may be possible to adjust the relative amounts of the fuels to take advantage of the increased charge cooling of alcohol fuels (e.g., via direct injection) to reduce the tendency of knock. This phenomenon, combined with increased compression ratio, and/or boosting and/or engine downsizing, can then be used to obtain large fuel economy benefits (by reducing the knock limitations on the engine).

FIG. 2 shows one example fuel system with two fuel injectors per cylinder, for at least one cylinder. Further, each cylinder may have two fuel injectors. The two injectors may be configured in various locations, such as two port injectors, one port injector and one direct injector (as shown in FIG. 2), or others.

Also, as described herein, there are various configurations of the cylinders, fuel injectors, and exhaust system, as well as various configurations for the fuel vapor purging system and exhaust gas oxygen sensor locations.

Continuing with FIG. 2, it shows a dual injection system, where engine 10 has both direct and port fuel injection, as well as spark ignition. Internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) may be coupled to crankshaft 40 via a flywheel (not shown), or alternatively direct engine starting may be used.

In one particular example, piston 36 may include a recess or bowl (not shown) to help in forming stratified charges of air and fuel, if desired. However, in an alternative embodiment, a flat piston may be used.

Combustion chamber, or cylinder, 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

Fuel injector 66A is shown directly coupled to combustion chamber 30 for delivering injected fuel directly therein in proportion to the pulse width of signal dfpw received from controller 12 via electronic driver 68. While FIG. 2 shows injector 66A as a side injector, it may also be located overhead of the piston, such as near the position of spark plug 92. Such a position may improve mixing and combustion due to the lower volatility of some alcohol based fuels. Alternatively, the injector may be located overhead and near the intake valve to improve mixing.

Fuel may be delivered to fuel injector 66A by a high pressure fuel system (not shown) including a fuel tank, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tank (or tanks) may (each) have a pressure transducer providing a signal to controller 12.

Fuel injector 66B is shown coupled to intake manifold 44, rather than directly to cylinder 30. Fuel injector 66B delivers injected fuel in proportion to the pulse width of signal pfpw received from controller 12 via electronic driver 68. Note that a single driver 68 may be used for both fuel injection systems, or multiple drivers may be used. Fuel system 164 is also shown in schematic form delivering vapors to intake manifold 44. Various fuel systems and fuel vapor purge systems may be used, such as those described below herein with regard to FIGS. 8-10, for example.

Intake manifold 44 is shown communicating with throttle body 58 via throttle plate 62. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control. In an alternative embodiment (not shown), a bypass air passageway is arranged in parallel with throttle plate 62 to control inducted airflow during idle speed control via an idle control by-pass valve positioned within the air passageway.

Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. Further details of air-fuel ratio control are included herein.

Distributorless ignition system 88 provides ignition spark to combustion chamber 30 via spark plug 92 in response to spark advance signal SA from controller 12.

Controller 12 may cause combustion chamber 30 to operate in a variety of combustion modes, including a homogeneous air/fuel mode and a stratified air/fuel mode by controlling injection timing, injection amounts, spray patterns, etc. Further, combined stratified and homogenous mixtures may be formed in the chamber. In one example, stratified layers may be formed by operating injector 66A during a compression stroke. In another example, a homogenous mixture may be formed by operating one or both of injectors 66A and 66B during an intake stroke (which may be open valve injection). In yet another example, a homogenous mixture may be formed by operating one or both of injectors 66A and 66B before an intake stroke (which may be closed valve injection). In still other examples, multiple injections from one or both of injectors 66A and 66B may be used during one or more strokes (e.g., intake, compression, exhaust, etc.). Even further examples may be where different injection timings and mixture formations are used under different conditions, as described below.

Controller 12 can control the amount of fuel delivered by fuel injectors 66A and 66B so that the homogeneous, stratified, or combined homogenous/stratified air/fuel mixture in chamber 30 can be selected to be at stoichiometry, a value rich of stoichiometry, or a value lean of stoichiometry.

Emission control device 72 is shown positioned downstream of catalytic converter 70. Emission control device 72 may be a three-way catalyst or a NOx trap, or combinations thereof.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58;

engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; absolute Manifold Pressure Signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In a one example, sensor 118, which is also used as an engine speed sensor, produces a predetermined number of equally spaced pulses every revolution of the crankshaft.

In this particular example, temperature Tcat1 of catalytic converter 70 is provided by temperature sensor 124 and temperature Tcat2 of emission control device 72 is provided by temperature sensor 126. In an alternate embodiment, temperature Tcat1 and temperature Tcat2 may be inferred from engine operation.

Continuing with FIG. 2, a variable camshaft timing system is shown. Specifically, camshaft 130 of engine 10 is shown communicating with rocker arms 132 and 134 for actuating intake valves 52a, 52b and exhaust valves 54a, 54b. Camshaft 130 is directly coupled to housing 136. Housing 136 forms a toothed wheel having a plurality of teeth 138. Housing 136 is hydraulically coupled to crankshaft 40 via a timing chain or belt (not shown). Therefore, housing 136 and camshaft 130 rotate at a speed substantially equivalent to the crankshaft. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

While this example shows a system in which the intake and exhaust valve timing are controlled concurrently, variable intake cam timing, variable exhaust cam timing, dual independent variable cam timing, or fixed cam timing may be used. Further, variable valve lift may also be used. Further, camshaft profile switching may be used to provide different cam profiles under different operating conditions. Further still, the valvetrain may be roller finger follower, direct acting mechanical bucket, electromechanical, electrohydraulic, or other alternatives to rocker arms.

Continuing with the variable cam timing system, teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 may also provide an indication of oxygen concentration in the exhaust gas via signal 162, which provides controller 12 a voltage indicative of the $O_2$ concentration. For example, sensor 160 can be a HEGO, UEGO, EGO, or other type of exhaust gas sensor. Also note that, as described above with regard to sensor 76, sensor 160 can correspond to various different sensors.

As described above, FIG. 2 merely shows one cylinder of a multi-cylinder engine, and that each cylinder has its own set of intake/exhaust valves, fuel injectors, spark plugs, etc.

Also, in the example embodiments described herein, the engine may be coupled to a starter motor (not shown) for starting the engine. The starter motor may be powered when the driver turns a key in the ignition switch on the steering column, for example. The starter is disengaged after engine starting, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 44 via an EGR valve (not shown). Alternatively, a portion of combustion gases may be retained in the combustion chambers by controlling exhaust valve timing.

As noted above, engine 10 may operate in various modes, including lean operation, rich operation, and "near stoichiometric" operation. "Near stoichiometric" operation can refer to oscillatory operation around the stoichiometric air fuel ratio. Typically, this oscillatory operation is governed by feedback from exhaust gas oxygen sensors. In this near stoichiometric operating mode, the engine may be operated within approximately one air-fuel ratio of the stoichiometric air-fuel ratio. This oscillatory operation is typically on the order of 1 Hz, but can vary faster and slower than 1 Hz. Further, the amplitude of the oscillations are typically within 1 a/f ratio of stoichiometry, but can be greater than 1 a/f ratio under various operating conditions. Note that this oscillation does not have to be symmetrical in amplitude or time. Further note that an air-fuel bias can be included, where the bias is adjusted slightly lean, or rich, of stoichiometry (e.g., within 1 a/f ratio of stoichiometry). Also note that this bias and the lean and rich oscillations can be governed by an estimate of the amount of oxygen stored in upstream and/or downstream three way catalysts.

As described below, feedback air-fuel ratio control is used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) can be adjusted based on a desired air-fuel ratio and the air-fuel ratio from the sensor. Further still, individual cylinder air-fuel ratio control could be used, if desired. As described in more detail below, adjustments may be made with injector 66A, 66B, or combinations therefore depending on various factors.

Also note that various methods can be used to maintain the desired torque such as, for example, adjusting ignition timing, throttle position, variable cam timing position, exhaust gas recirculation amount, and number of cylinders carrying out combustion. Further, these variables can be individually adjusted for each cylinder to maintain cylinder balance among all the cylinders.

Referring now to FIG. 3, an example engine 10 is shown with four in-line cylinders. In one embodiment, engine 10 may have a turbocharger 319, which has a turbine 319a coupled in the exhaust manifold 48 and a compressor 319b coupled in the intake manifold 44. While FIG. 3 does not show an intercooler, one may optionally be used. Turbine 319a is typically coupled to compressor 319b via a drive shaft 315. Various types of turbochargers and arrangements may be used. For example, a variable geometry turbocharger (VGT) may be used where the geometry of the turbine and/or compressor may be varied during engine operation by controller 12. Alternately, or in addition, a variable nozzle turbocharger (VNT) may be used when a variable area nozzle is placed upstream and/or downstream of the turbine in the exhaust line (and/or upstream or downstream of the compressor in the intake line) for varying the effective expansion or compression of gasses through the turbocharger. Still other approaches may be used for varying expansion in the exhaust, such as a waste gate valve. FIG. 3 shows an example bypass valve 320 around turbine 319a and an example bypass valve 322 around compressor 319b, where each valve may be controller via controller 12. As noted above, the valves may be located within the turbine or compressor, or may be a variable nozzle.

Also, a twin turbocharger arrangement, and/or a sequential turbocharger arrangement, may be used if desired. In the case of multiple adjustable turbocharger and/or stages, it may be desirable to vary a relative amount of expansion though the turbocharger, depending on operating conditions (e.g. manifold pressure, airflow, engine speed, etc.). Further, a supercharger may be used, if desired.

Figure 4:
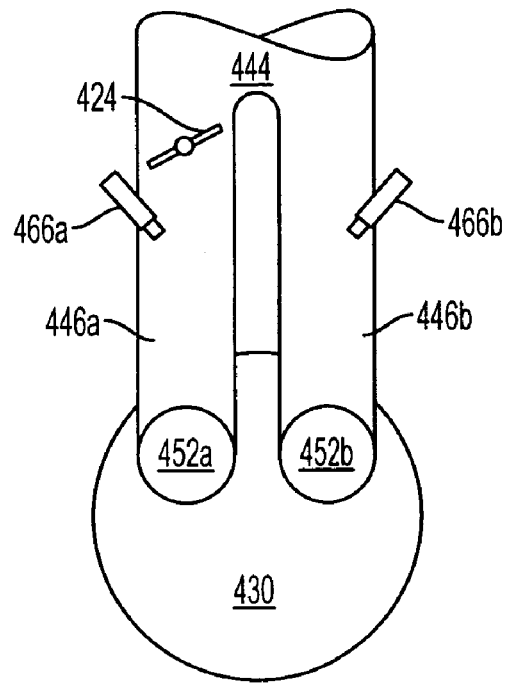
FIGS. 4-5 show example engine cylinder and port configurations.

Referring now to FIG. 4, an alternative embodiment of engine 10 is shown with two port fuel injectors per cylinder for cylinders with three or more valves (e.g., two or more intake valves, such as a 3-valve engine or a 4-valve engine). Even though this example utilizes port injection, it may still be possible to exploit increased charge cooling effects of various fuels or other substances (such as ethanol, gasoline, water, mixtures thereof, etc). For example, in some cases, port injection can attain some charge cooling benefits at wide-open throttle conditions by using open valve injection (OVI). However, since an additional injector is supplied, the wide-open throttle OVI benefit may not be reduced by the need to design single port-injector systems to satisfy other constraints, such as: control at low fuel flows, cold start fuel behavior, and transient fuel behavior (usually with closed-valve injection). Thus, by using two fuel injectors it is possible to better exploit open valve injection, while still retaining desired functionality during various operating conditions.

As one example, since two injectors are used, they may each be designed with smaller valve flows/openings so that under low load conditions it may be possible to provide more accurate quantity control (e.g., by using only one of the injectors).

As another example, when using different fuels or other substances for the two injectors (e.g., one injecting gasoline and one injecting a fuel having an alcohol component, such as ethanol or E85) many of the above system constraints can be satisfied. For example, by using separate port injectors for fuels with alcohol (e.g., ethanol) and gasoline, and using the alcohol injector at higher loads when the engine is warmed up, some of the constraints at low fuel flow and cold start are avoided for the alcohol injector. Further, if the alcohol injector is operated with OVI timing, or at least partial OVI timing, then transient fuel problems may also be reduced for the ethanol injector.

Additionally, using OVI timing (at least under some conditions) allows the alcohol injector spray pattern and targeting to be optimized for OVI. The spray could be much narrower angle than for the gasoline port injector, to increase the probability that most of the fuel enters the cylinder as a liquid, instead of evaporating from intake port and intake valve metal surfaces. This would increase the evaporative cooling benefit in a manner similar to direct injection. Also, the injector targeting may be selected to reduce bore wash issues, in which liquid fuel washes oil off cylinder walls, potentially causing excessive wear.

In this way, in some cases, it may be possible to achieve advantageous results without requiring direct injection. For example, by using two port fuel injectors per cylinder it may be possible to reduce system cost, reduce required fuel rail pressure (high fuel rail pressure can reduce fuel economy due to parasitic losses of the fuel pump), and reduce packaging issues (direct injection may require compromised valve sizes and/or angles, intake or exhaust port shapes, etc.).

Specifically, FIG. 4 shows a cylinder 430 with two intake ports 446a and 446b of intake manifold 444 coupled respectively to intake valves 452a and 452b. A first injector 466A is coupled in port 446a, and a second injector 466B is coupled in port 446b. If desired, valve 424 may be used to deactivate port 446a under selected engine speed, load, and/or temperature conditions. Alternatively, a charge motion control valve may be used, if desired.

While FIG. 4 shows injector 466a downstream of valve 424, it may also be placed upstream of valve 424 in an alternative embodiment.

In one embodiment, injector 466A injects a fuel having alcohol, such as ethanol, methanol, or a mixture of gasoline with an alcohol (e.g., E85, M85, or other such blends and ratios), while injector 466B injects gasoline. The gasoline injection may be performed at least partially during conditions when valve 452b is open. Alternatively, gasoline injection from injector 466B may be performed at least partially during conditions when valve 452b is closed. In still another example, gasoline injection from injector 466B may be performed at least partially during conditions when valve 452b is closed and at least partially during conditions when valve 452b is open. In yet another example, under some conditions open valve injection may be used while in other conditions closed valve injection may be used. Thus, the two injectors may be of a different type due to physical location, type of substance being injected, operating strategy, etc.

In one example, the valve 424 may be adjusted to reduce airflow (i.e., made more closed) under lower engine load conditions where fuel is primarily provided by injector 466B. While a single valve is shown, multiple valves may be used if desired. Also, each cylinder may have such a valve, and each of such valves may be controlled by a single actuation. In this way, it is possible to position a valve to obtain the desired flow for the injectors that are active under different conditions.

Figure 5:
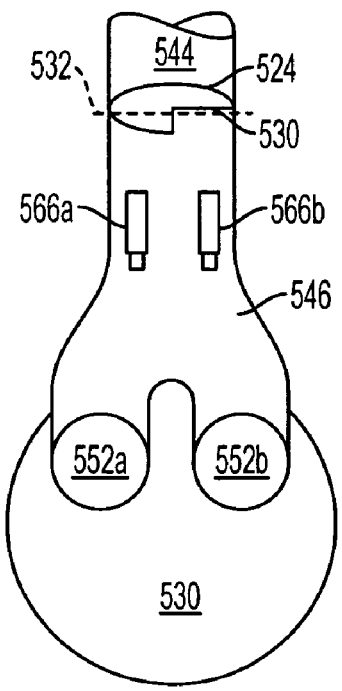

Referring now to FIG. 5, it shows a cylinder 530 with a single intake port 546 of intake manifold 544 coupled respectively to intake valves 552a and 552b. A first injector 566A and a second injector 566B are coupled to port 546. If desired, valve 524 may be a charge motion control valve which restricts flow around injector 566A to a greater extent than injector 566B under selected engine speed, load, and/or temperature conditions. Again, injector 566A may inject a fuel having alcohol, such as ethanol, methanol, or a mixture of gasoline with an alcohol (e.g., E85, M85, or other such blends and ratios), while injector 566B may inject gasoline. Thus, the two injectors may be of a different type due to physical location, spray pattern and/or targeting, type of substance being injected, mixture of substance being injected, heat of vaporization of substance being injected, or operating strategy, etc.

FIG. 5 shows valve 524 being an elliptical valve with an asymmetric notch 530 removed from the plate. The notch provides airflow near injector 566B whether the valve is open, closed, or partially open/closed, yet can restrict airflow to a greater extent near injector 566A. The valve rotates about an axis 532 in response to actuation by controller 12.

By adjusting valve 424 (or 524), it is possible to take advantage of the fact that at high loads, both ethanol injection and open (or partially open) valve operation provide improved performance. At lower loads, the valve(s) may be closed (or partially closed), and the gasoline injector can spray fuel into the active intake port, and the ethanol injector may be deactivated. At higher loads, the valve would be open or partially open, and ethanol could be injected into one port while gasoline is injected into the other port.

Further, by using different operation of the two port injectors (e.g., different timing, different fuels, different injectors for a cylinder, etc.) it is possible to reduce a compromise between package-space and air/fuel mixing. Further, it allows one injector to be placed in each intake port, and ensures that fuel can always be supplied to a port that is flowing air. By reducing airflow in a port when the injector is not injecting fuel, it is possible to maintain acceptable air-fuel mixing in the other port that is flowing air with injected fuel. Further, such an approach may provide improved packaging compared with twin-spray injectors that may require a more central injector location between the ports, making it more difficult to package two injectors per cylinder.

Figure 6A:
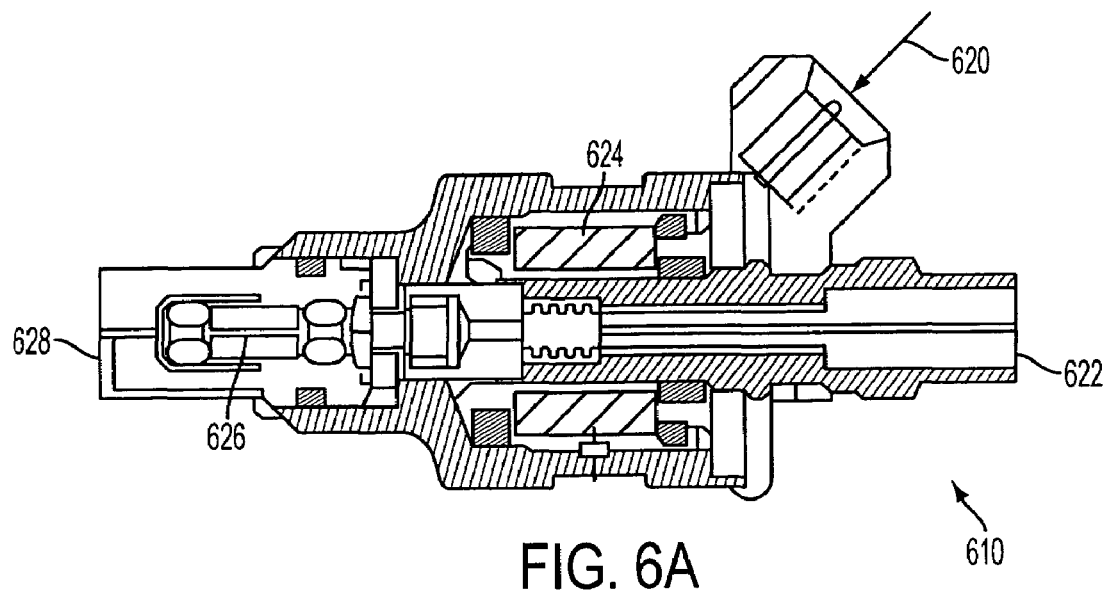
FIGS. 6A and 6B show two fuel injectors.
Figure 6B:
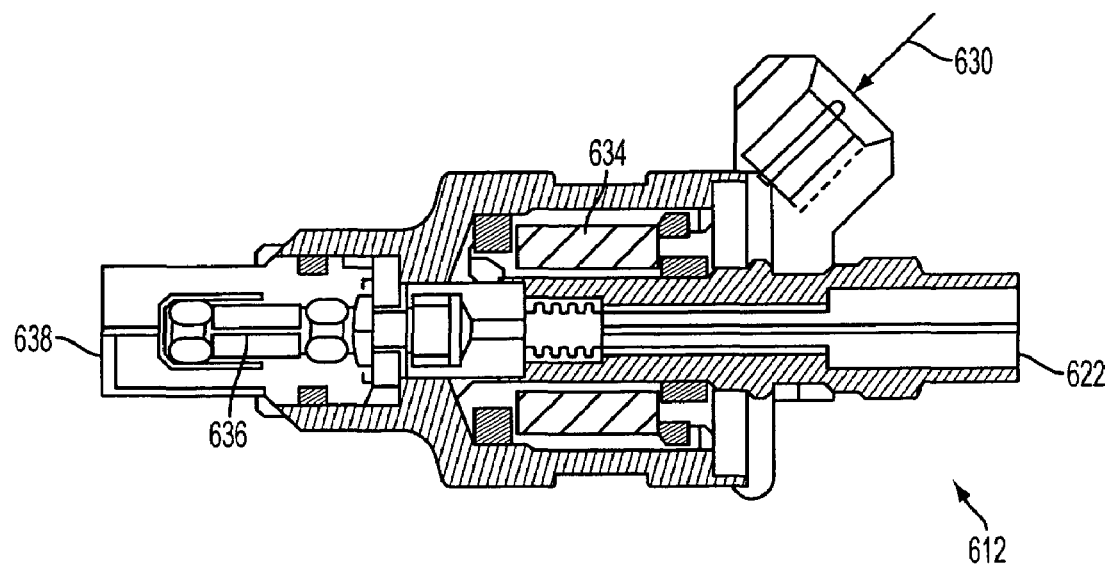

Referring now to FIGS. 6A and 6B, two fuel injectors are shown (610 and 612) with at least one different characteristic. Injector 610 may be used as injector 66A, 466A, 566A, etc., while injector 612 may be used as injector 66B, 466B, 566B, or vice versa, or combinations thereof, etc. The differing characteristic(s) between the injectors may be one or more of the following: injector size, injector dynamic range, materials, minimum pulse width, injector slope (flow to pulse width), orifice size, spray pattern, spray pattern area, spray targeting, or others as discussed herein.

In one example, both injectors are sized to meet peak torque requirements (for example a maximum airflow or air-charge). However, in an example where one injector provides gasoline and the other injector provides an alcohol blend (e.g., ethanol, E85, methanol, etc.), the power densities of the fuels may be different. In such a case, the injector for the alcohol based fuel may be sized to provide a different maximum fuel flow (e.g., approximately 37% higher to account for pure ethanol).

Referring now specifically to FIG. 6A, injector 610, which may be a direct cylinder injector or a port injector, is shown receiving a command signal 620 from controller 12. Pressurized fuel is supplied to inlet 622, the flow of which is governed by an electromagnetic actuator having coil 624, coupled to needle 626 cooperating with pintle 628. The shape of pintle 628 may affect the spray geometry as well as the flow rate of the injector. Further, the size and shape of the needle may also affect flow and spray patterns, as well as response time.

FIG. 6B also shows injector 612, with similarly labeled components, including a command signal 630, inlet 632, coil 634, needle 636, and pintle 638. As noted above, the pintles 628 and 638 may different in size, shape, material, or combinations thereof. Further, inlets 622/632, coils 624/634, and/or needles 626/636 may have different geometry, shapes, sizes, materials, weights, surface finishes, etc.

In this way, the respective injectors may be designed to provide different functionality and/or injection type (e.g., fuel type) compatibility so that improved engine operation and control may be achieved. As noted herein, an injection type may refer to different injection locations, different substances being injected (e.g., water vs. fuel), different fuel types being injected, different fuel blends being injected, different alcohol contents being injected (e.g., 0% vs. 85%), etc. Further note that different injection types may also refer to different substances being injected via a common injector, where a type 1 injection may be a gasoline amount in the injection and type 2 injection may be an alcohol amount in the injection.

Figure 7:
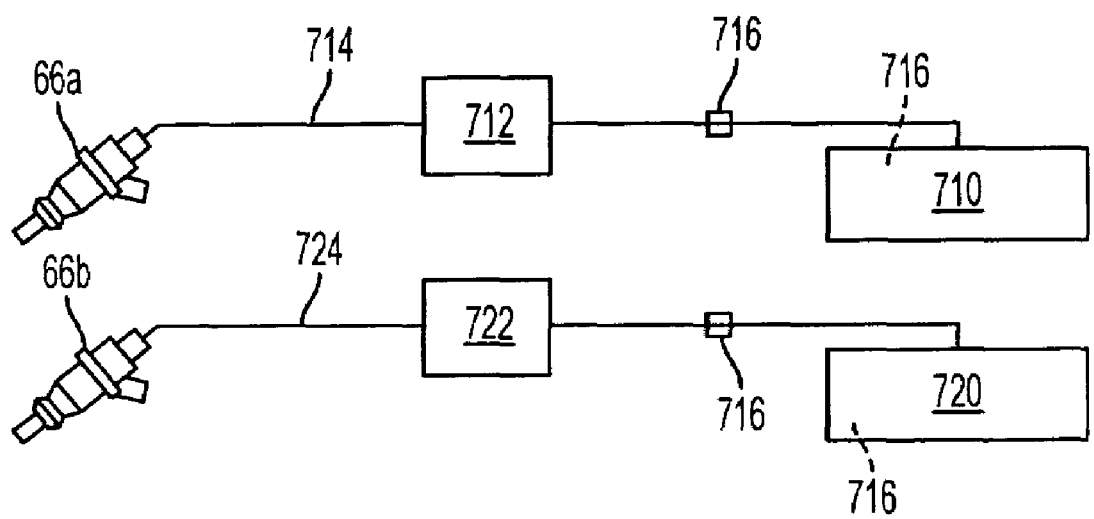
FIG. 7 shows a fuel pump system.

Referring now to FIG. 7, a portion of an exemplary fuel injection system is depicted. More particularly, the figure shows an example fuel pump configuration where a separate fuel pump and tank is provided for a first and second fuel type. Specifically, a first tank 710 is shown for holding fuel or other substance of a first type, with pump 712 leading to injector 66A via fuel rail 714. Likewise, a second tank 720 is shown for holding fuel or other substance of a second type, with pump 722 leading to injector 66B via fuel rail 724. While the pumps are shown outside the tank, in an alternative example one or both of the pumps may be located within the tank. Further, a second, high pressure fuel pump may be added to one or both the fuel lines downstream of respective low pressure pumps.

One or both the fuel systems may be returnless-type fuel systems, return-type fuel systems, or combinations thereof. Further, the fuel systems may have different characteristics, such as different size tanks, different size pump, different pump capacity, different pump pressure, different pump maximum flows, different on/off cycles (e.g., pump 712 may run more intermittently than pump 722), etc. Note that in some examples, only one pump may operate under some conditions. For example, if fuel from tank 710 is not needed, or not enabled (e.g., during cold start conditions), pump 712 may be deactivated (or not activated) while pump 722 operates. In this way, less battery power may be used, and less vapors may be generated.

One or both of the fuel systems may include a sensor or sensor system 716, including a sensor or sensors for measuring fuel levels (e.g., in tanks 710 and/or 720), fuel flow rates and/or fuel pressures.

In one example, the first tank contains an alcohol blend, such as ethanol or an ethanol-gasoline mixture, while the second tank contains gasoline. However, other fuel types may also be used.

Also, it should be understood that tanks 710 and 720 may be supplied through separate vehicle ports (e.g., a fill port for gasoline and a separate fill port for ethanol), or through a shared port. One example of a shared port system is where a blend such as E85 is used to fill the vehicle, and then an on-board extraction system is used to separate the different fuel types in the blend into tanks 710 and 720. In the example of an ethanol/gasoline blend such as E85, extraction methods may be based on differing polarities, size, and/or electrochemical properties of the ethanol and gasoline molecules.

In cases where multiple fuel types are employed, various control routines and methodologies may be employed to control delivery of different fuel types, and/or water injections, to the cylinders. As used herein, different fuel or injection types may refer to different fuels (e.g., alcohol containing fuels vs. gasoline) or may refer to different injector locations (e.g., port vs. direct), or may be different sized injectors (e.g., one having higher maximum flow than the other), or may refer to other injection characteristics, fuel delivery characteristics, spray characteristics, fuel property characteristics (e.g., temperature, heat capacity, power density, etc.) or may refer to gasoline injection versus water injection, or others, or may refer to different fuel blends (where one fuel type has relatively more or less ethanol than another fuel type). Also, the fuel types may be separately delivered to the combustion chamber, or mixed before delivery to the combustion chamber.

With multiple fuel types (or fuel and water injection), control of different injection amounts typically is based on engine operating conditions. For instance, one control example involves controlling injection amounts to achieve a desired overall air-fuel ratio. Such control may be performed using feedback from an exhaust gas oxygen sensor (or other sources) to provide the desired ratio. In such an example, it may be necessary to select which of the fuels to adjust in order to achieve the desired air-fuel ratio. The bandwidth of needed adjustments, minimum and maximum pulse width limits, and various other factors can influence which fuels are adjusted in response to feedback information, and/or relative amounts of adjustment between multiple injectors based on feedback information. For example, where gasoline is the type 1 injection and water is included in the type 2 injection (e.g., a water-alcohol or water-ethanol mix), adjustment of the type 2 injection in response to air-fuel ratio errors becomes decreasingly effective as the water fraction in the mix increases. Thus, in such an embodiment, adjustment of the type 2 injection to affect air-fuel ratio (e.g., in response to exhaust gas oxygen sensor feedback) may be stopped or disabled when the water fraction surpasses a limit, such as 0.7, for example, and thus all or most all of the adjustments can be made with a type 1 injection, such as gasoline injection. Another criteria that may be used in selecting injectors for feedback control may be based on how much fuel is in the respective tanks, and thus if one fuel is low, it may be not be increased in response to feedback to conserve that fuel.

The described feedback control allows different fuel types (e.g., injection locations, fuel qualities, fuel densities, fuel heat capacities, etc.) to be used under different conditions and in different amounts to facilitate air-fuel feedback corrections depending on operating conditions.

Injection control and enabling of different fuel types may also be controlled based on various temperature-related engine operating conditions, such as those occurring during start and/or warm-up. In particular, control routines may monitor engine speed, cranking motor, key-on operation, or various other parameters to identify an engine start. Type 1 fuel injections, such as gasoline, may then be enabled. Then, upon meeting a temperature threshold, such as specified temperature levels of engine coolant or the catalyst, Type 2 injections (e.g., ethanol) may be enabled. In this way, it is possible to utilize fuel type 1 for engine starting and/or engine warm-up, and avoid using fuel type 2 until the engine and exhaust system have warmed, for cases where fuel type 2 is more difficult to vaporize, such as an alcohol containing fuel (e.g., ethanol or an ethanol blend), for example. In addition, knock suppression may be less needed at lower temperatures, such that limiting or conserving ethanol usage at low temperatures will save it for later use, such as when more knock suppression is needed.

Fuel injection control may be predicated on temperature inputs other than engine coolant. Other parameters may be used, such as ambient air temperature, ambient pressure, oil temperature, etc. Likewise, various exhaust temperatures may be used, such as exhaust gas temperature, catalyst temperature, or estimates thereof. In this way, it is possible to provide an appropriate fuel for engine starting and/or warm-up. Further, the starting approaches discussed herein may be used for re-starting, such as a hot-restart, a re-start after an unsuccessful start, starting after deceleration fuel shut-off, or starting an engine during rotation or from rest, such as with a hybrid vehicle (e.g., hybrid-electric vehicle).

After start-up and warm-up, injection amounts may be controlled based on a variety of parameters and operating conditions. For example, a desired ethanol fraction may be determined based on engine speed, load, remaining fuel levels of ethanol or gasoline, engine coolant temperature, engine oil temperature, driver requests such as tip-in, desired torque, ambient air temperature, engine intake air temperature, time since engine start, available fuel pressure, ambient humidity, exhaust temperature, gear ratios, etc. Each of these inputs can be measure or inferred, and they may be employed individually or in various combinations to establish relative amounts of the different fuels to be injected.

Adaptively learned parameters may be employed as well. The adaptive terms may be stored as a function of speed, load, temperature, or combinations thereof, for example. In this way, if knock consistently occurs in repeatable locations, an automatic increase in the amount of type 2 injection (e.g., a knock-reducing agent such as ethanol), for example, may be adaptively learned so that such adjustment can be made without waiting for feedback from a knock sensor.

Regardless of the particular control scheme, injection control may be continuously and dynamically updated to coordinate engine operation and satisfy driver requests while avoiding pre-ignition and knock.

The following provide further examples of injection control:

Ambient humidity may be used to adjust an amount of type 2 injection (e.g., ethanol, ethanol/water, etc.) for given operating conditions, as increased humidity can decrease knock tendency (and thus less type 2 injection may be needed), and vice versa.

A desired spark timing may also be varied as the relative amounts of type 1 and type 2 injections are varied, or as the individual amounts of the type 1 and type 2 injections are varied.

In one example, the amount of type 2 fuel may be determined based on compression ratio, boosting, and temperature so that engine knock may be reduced thus reducing a limit of spark advance.

Use of type 1 or type 2 fuels may be limited based on how much of each type of fuel is available in the vehicle storage tank(s).

Frequency of use may be a factor in enabling an injection of a fuel type. For example, it might be necessary to periodically operate with type 2 fuel if it has not been used frequently enough (e.g., to reduce deposit formation and or clogging of fuel lines and/or injectors).

Transient conditions may be detected and used to initiate an open-loop adjustment in the amount of type 2 (and type 1) injection. The adjustment may be include a temporary increase in a relative amount of type 2 injection in response to the transient condition detection. In one embodiment, a driver tip-in, such as a rapid tip-in from idle conditions, may be detected. In response to such conditions, a type 2 injection (e.g. direct or port injection of an alcohol-containing mixture, e.g., ethanol or an ethanol blend) may be temporarily increased with a predetermined or actively varying profile. In this way, the heat capacity/heat of vaporization of substances, such as fuel, injected into the engine may be increased, thereby reducing a tendency for tip-in knock. As one example, EF may be temporarily increased by 5-10 percent for one to 10 combustion cycles in response to a driver tip-in.

Injection control of different fuels and/or water may be based on any other parameter or condition, or combinations therefore, having a correlation with knock tendency or pre-ignition tendency (e.g., varying torque, engine speed, temperature, humidity, etc.).

In multiple fuel systems such as that described herein, it will often be desirable to determine or sense situations in which the requested fuel quantities are not able to be delivered. For example, as discussed herein, engine design characteristics, operating parameters and control schemes may be selected based on the assumed availability of a knock-suppressing alternate fuel or other substance, such as ethanol. When a given set of engine operating conditions calls for a specified injection of ethanol, various control routines of the engine may assume that the requested amount of ethanol is injected and that it has the anticipated effect on performance (e.g., an empirically determined reduction in knock). As discussed herein, the assumed knock suppression can affect spark timing, use of boost, etc.

In some cases, however, one or more of the fuel injection systems may be subject to a shortfall condition, in which the desired amount of fuel from that system is not available, or may not be available at a subsequent time. In an ethanol system, it will often be desirable to correct for or respond to current or anticipated deficiencies in ethanol availability, so as to avoid knock, elevated exhaust temperatures, excessive component wear, and other undesirable effects. The deficiency/shortfall can arise from a variety of causes. For example, the amount of ethanol in the storage tank may be low, or the tank may be empty. Pressures and/or flow rates in the fuel delivery system may be low. Fuel pump failures, filter or line clogging, electronics failures, or other malfunctions may prevent or impair injections of ethanol.

Whatever the cause of the shortfall condition, performance problems or damage may arise if the desired relative amounts of the different fuels are not available. Knocking may occur, and high temperatures and other conditions can result in damage to engine components and aftertreatment systems.

Figure 8:
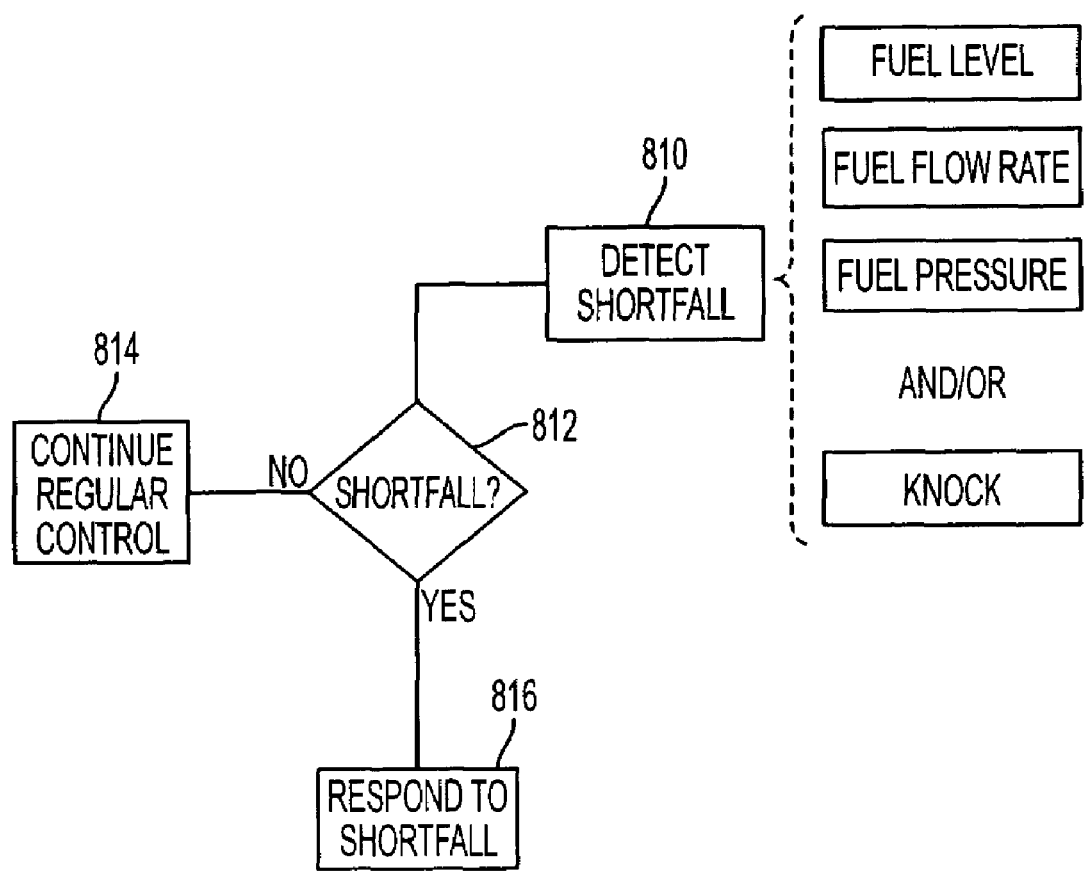
FIGS. 8-10 show exemplary control routines for controlling fuel injection in fuel systems employing multiple fuel types, and/or water injection.

Accordingly, the present disclosure provides a system and method for detecting such a shortfall condition. Furthermore, the disclosure provides for various types of remediation or other responses in the event of a shortfall. Referring now to FIG. 8 an exemplary method is depicted for detecting and actively adjusting for such a shortfall condition.

At 810, the method includes detecting the existence of the shortfall condition. At 812, an evaluation is made as to whether a shortfall condition exists. Processing continues to 814 if no shortfall is detected, and control of the engine operating parameters proceeds without modification. For example, if it were determined or inferred at step 810 that a requested amount of ethanol was in fact being injected, then normal operational control of the engine would continue at 814. However, in the event of a shortfall (e.g., ethanol tank empty or low, or a malfunction), then remedial measures would be taken at 816, for example to account for the reduced knock-suppression capability.

Referring still to FIG. 8, detecting the shortfall condition may be determined or inferred in a variety of ways. As indicated, a shortfall may be inferred or determined based on levels in the fuel tank(s), fuel pressure, fuel flow rate, and/or knock sensor data. As shown in FIG. 7, the different fuel injection subsystems may include a sensor or sensor system 716. 716 may be a level sensor configured to detect a level of fuel remaining in the tank, and/or whether the tank is empty. Alternatively, the sensor may be a flow rate sensor or a pressure sensor. Combinations of these sensor types may be employed as well, or sensing may be based on monitoring of fuel pump voltage, current, or speed. In any case, sensor data may be received at electronic engine controller 12 (FIG. 2) for determination of whether a shortfall condition exists. Typically, shortfall is determined upon a sensed variable crossing a threshold value, such as fuel level, flow rate or pressure falling below a threshold (thus indicating a possible current or future ethanol deficiency, for example), and/or knock sensor indication exceeding a threshold. The threshold or thresholds employed in determining existence of shortfall may vary as a function of other operating parameters or conditions.

Figure 9:
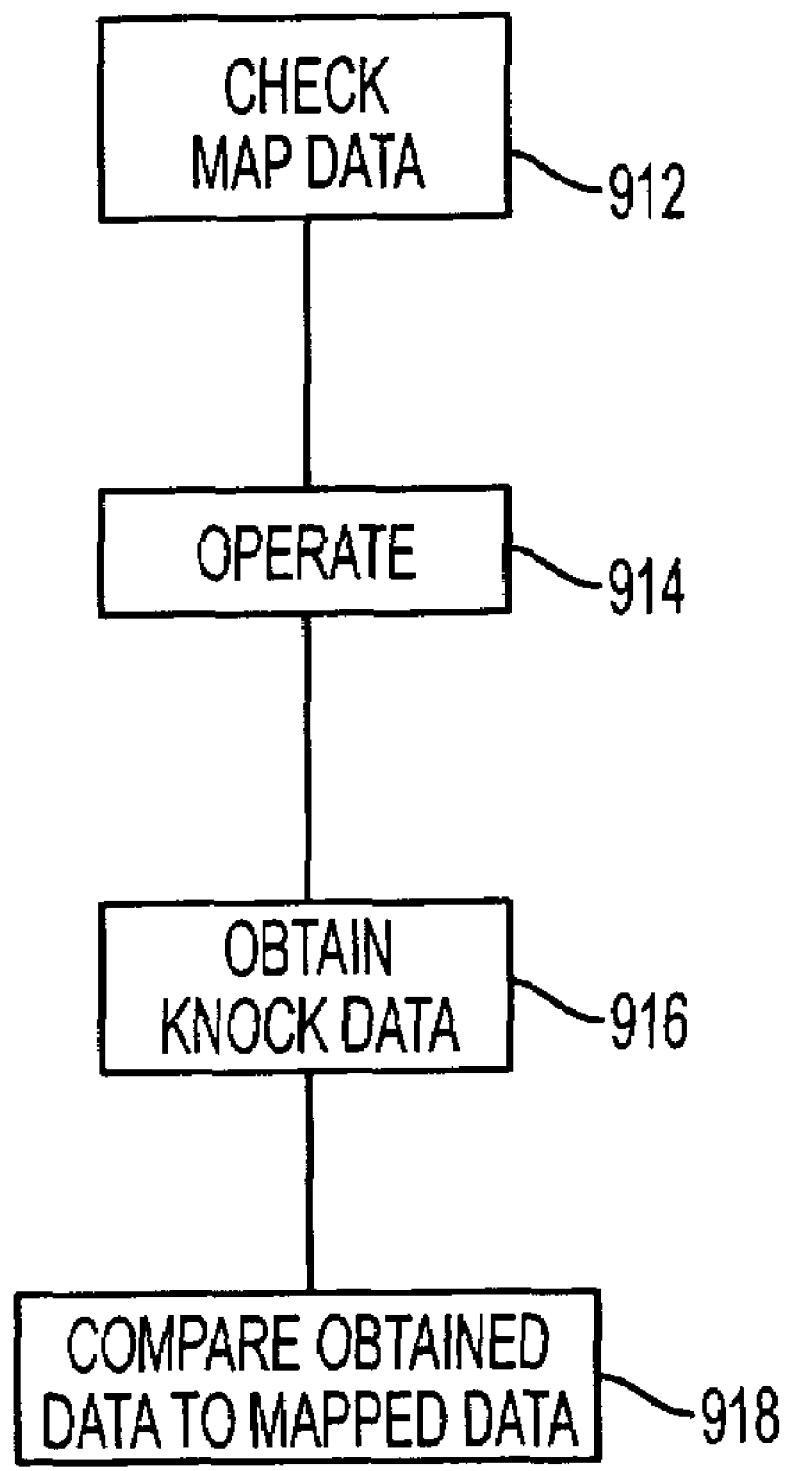

As shown in FIG. 8, knock sensor data may also be employed to detect a shortfall condition. Referring now to FIG. 9, an exemplary method for assessing shortfall based on knock sensor data is depicted. At 912, the method includes a check of mapping data to determine threshold levels of knock at the current operating condition. In typical examples, mapping data is available from a representative engine for a variety of operating conditions in order to determine threshold knock levels for cases with and without water/ethanol injection. Threshold levels may be mapped for spark timing, boost levels, throttling, load control, valve operations, air and/or coolant temperatures, and/or any other parameter, or combinations thereof, that cause variation in knock tendency. The mapping may be used to establish known baseline levels. Data obtained during operation of the vehicle may then be compared to the pre-acquired baseline data to aid in assessing secondary injection deficiencies.

Referring now more particularly to the example of spark timing, borderline spark data may be mapped on a representative engine during operation with ethanol/water injection, and also during operation without ethanol/water injection. The mapped data can then be stored (e.g., within controller 12) and referred to during operation as a baseline reference point. In particular, the depicted exemplary method proceeds at 914 and 916 with engine operation and receiving of knock data, such as knock data received at controller 12 from knock sensor 182.

The received data may then be compared to the mapped data to facilitate determination of whether a shortfall condition has occurred, as shown at 918. Assume, for example, that under a given set of operating conditions and with a given injection of water/ethanol, the mapped data indicates borderline spark occurring at a particular spark timing or range of timings. Assuming further that a non-knocking spark timing was employed, an indication of knock or borderline knock from the knock sensor may be used to infer existence of a shortfall condition. In other words, if received knock data differs sufficiently from that expected as a result of the mapping, then it may be inferred from such deviation that a failure or other shortfall condition has arisen in the ethanol/water system.

Figure 10:
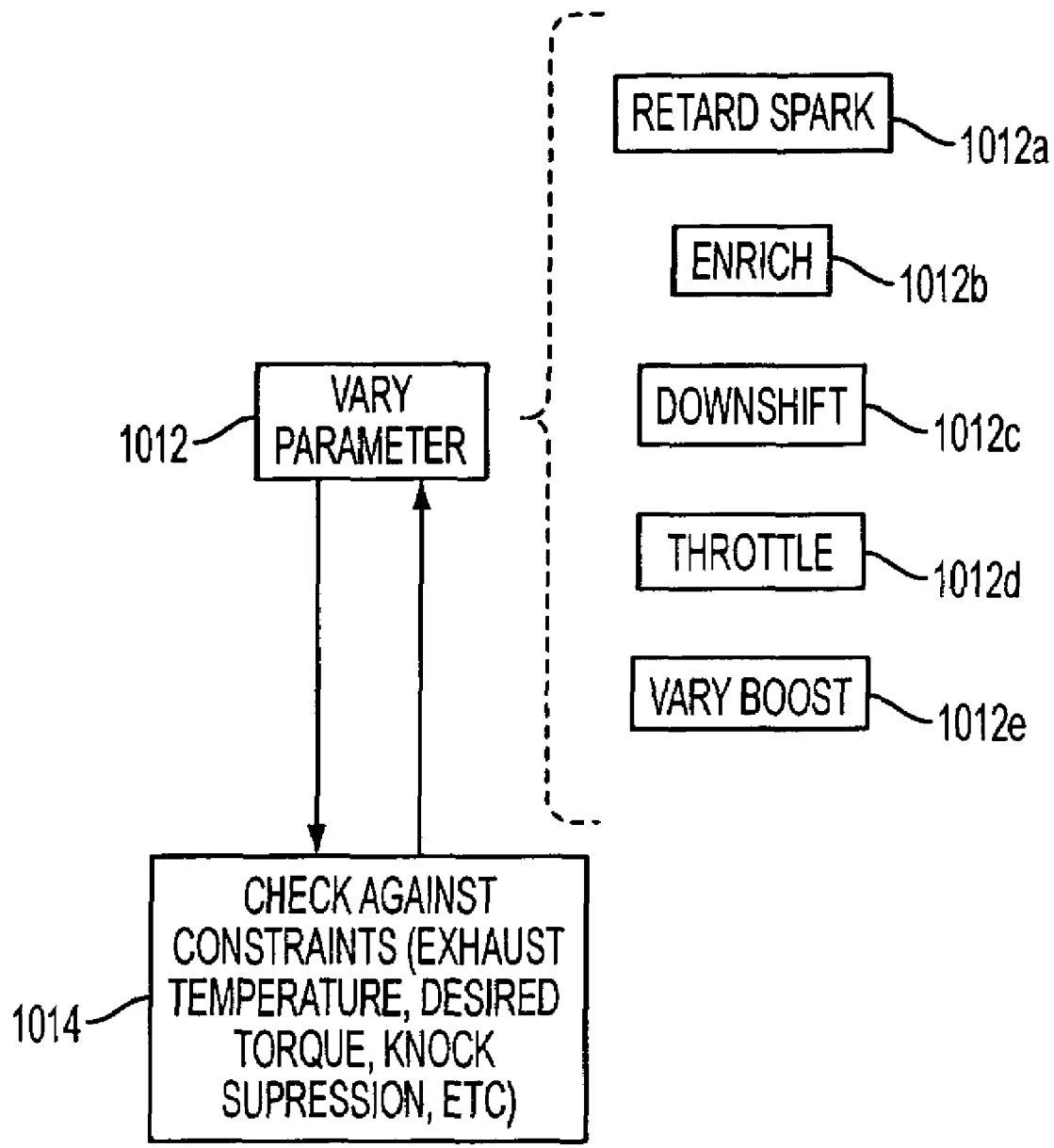

Referring now to FIG. 10, an exemplary method of compensating for the shortfall condition is depicted. At 1012, the method includes varying an operating parameter of the engine in response to the shortfall condition. Failure of ethanol injections can cause knock, produce elevated temperatures, and produce other effects. Additionally, remedial steps such as a change in spark timing, boost, etc., as will be further explained, can cause torque changes and have other effects. Accordingly, as shown at 1014, the method may include dynamically monitoring operation of the engine (e.g., through feedback control) to ensure that the parameter variation at 1012 does not cause excessively elevated exhaust temperatures, knock, unacceptably large torque variations, etc. The dynamic monitoring and feedback at 1012 and 1014 commonly will result in modification of different parameters (or combinations thereof) at step 1012, and/or modifying those parameters by different amounts in order to satisfy the constraints of step 1014, or other operational requirements.

Referring still to FIG. 10, one or more operating parameters may be modified during and/or in response to a shortfall condition. Spark timing may be retarded (1012*a*); the air-fuel ratio may be enriched (1012*b*), for example by increasing the type 1 injection (e.g., gasoline); transmission downshift may be commanded (1012*c*) to reduce load; electronic throttle control may be varied (1012*d*) to reduce cylinder pressures and thereby suppress knock; boost levels may be varied (e.g., reduced) (1012*e*), etc. These steps may taken individually, or in combination, simultaneously or in any desired order. However, as indicated above, the different remedial actions of 1012 may be dynamically constrained or controlled at 1014 by various requirements, such as exhaust temperature, maintenance of requested torque, etc. These responsive actions are but examples. Other parameters, or combinations of parameters, may be employed in response to conditions indicating a current or potential future deficiency in the knock-suppressing agent and/or its delivery system. Also, a warning indicator may be activated to alert the vehicle operator, for example that the ethanol supply needs to be refilled.

Still referring to the different remedial steps of 1012, various examples are possible. In a first example, sensitivity of knock-limited spark advance may be mapped to a number of variables, such as RPM, torque, air/fuel ratio, engine intake air temperature, etc. Where spark retard is employed, the amount of spark retard may be limited by exhaust temperature (e.g., at 1014), which can be accounted for by inferring exhaust temperature or through other methods. Also, torque models may be employed to increase manifold pressure and make up for lost torque resulting from the spark retard. This may include increasing boost levels at some operating conditions.

In another example, where spark retard alone to avoid knock may be insufficient (e.g., excessive spark retard can cause surge and/or high exhaust temperature), additional modifications may be made. For example, the routine can first retard spark as much as feasible, then enrich the combustion air-fuel ratio (e.g., at 1012*b*) to avoid or reduce knock Enrichment may be employed to mitigate knock and/or to avoid excessive exhaust temperature for component protection. If the maximum feasible enrichment is encountered, then a transmission downshift may be commanded (1012*c*).

In yet another example, the routine can first retard spark as much as feasible, then command a transmission downshift. If there is still a potential for knock, the routine can then enrich enough to avoid or reduce knock.

In still another example, the routine can limit maximum load with electronic throttle control (1012*d*). Such an approach may be used alone, or in combination with one of the first, second, and/or third embodiment above if those approaches provide insufficient knock control (because limiting maximum load may cause degraded driver satisfaction). The maximum allowed load can be mapped as a function of engine speed, engine coolant temperature, relative air/fuel ratio, and other variables.

In still another example, the routine can limit maximum boost with the wastegate and/or compressor bypass valve. Again, such action may be used alone, or in addition to any of the above examples, if those strategies provide insufficient knock control (again because limiting maximum boost may cause driver dissatisfaction). The maximum allowed boost can be mapped as a function of, engine speed, engine coolant temperature, relative air/fuel ratio, humidity, and other variables. In addition, the allowed level of boost may be determined on representative hardware to be safe under all conditions with ethanol/water injection system failure.

In still another example, operation may be adjusted upon determining that supply of a knock-suppressing agent is low or depleted. Such a routine may involve determining whether the manifold absolute pressure level, and/or boosting level, can be maintained without enrichment if the knock-suppressing agent is not used. In other words, the routine determines whether the secondary injection is needed to avoid knock without adjusting using enrichment and/or spark retard, for example.

Further, once it has been determined that the secondary supply is running low, the goal of the control system could be to maintain stoichiometric operation as long as possible to maintain emissions performance. The operating conditions could be evaluated to determine if the desired torque (or close to the desired torque) could be achieved with spark retard and without (or with reduced) fuel enrichment. If the desired torque could be obtained by increasing boost and retarding spark, then the secondary injection (e.g., ethanol or an ethanol blend) could be disabled. However, if enrichment is needed, then the secondary injection could be used. In such a circumstance, acceptable operating conditions in which the secondary injection is disabled could be mapped to determine acceptable spark, fuel, throttle, and boost settings without the secondary injection (e.g., without ethanol or with reduced ethanol). Then, once the secondary reservoir was depleted, the engine could still operate, but with potentially reduced maximum engine performance and/or reduced fuel economy (because of the potential need for additional fuel enrichment and spark retard to counteract knock).

In still another example, boost pressures (such as those generated by the structures of FIG. 3), may be controlled based on based on actual or potential deficiencies in the knock-suppressing agent. In this example, a desired amount of boost pressure could be determined first, assuming no ethanol deficiency. Then, upon sensing of an actual or potential deficiency (e.g., ethanol malfunction, ethanol supply low or depleted, etc.), the system may reduce boost pressure (e.g., by limiting the maximum boost) to reduce a tendency of knock caused by lack of a desired amount of the knock-suppressing agent.

It will be appreciated that the configurations, systems, and routines disclosed herein are exemplary in nature, and that these specific embodiments are not to be considered in a limiting sense, because numerous variations are possible. For example, the above approaches can be applied to V-6, I-3, I-4, I-5, I-6, V-8, V-10, V-12, opposed 4, and other engine types.

As another example, engine 10 may be a variable displacement engine in which some cylinders (e.g., half) are deactivated by deactivating intake and exhaust valves for those cylinders. In this way, improved fuel economy may be achieved. However, as noted herein, in one example injection using multiple types of fuel delivery (e.g., fuel composition or delivery location) can be used to reduce a tendency of knock at higher loads. Thus, by operating with direct injection of a fuel containing alcohol (such as ethanol or an ethanol blend) or other substance during cylinder deactivation operation, it may be possible to extend a range of cylinder deactivation, thereby further improving fuel economy.

As will be appreciated by one of ordinary skill in the art, the specific routines described herein in the flowcharts and the specification may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated steps or functions may be repeatedly performed depending on the particular strategy being used. Further, these figures graphically represent code to be programmed into the computer readable storage medium in controller 12. Further still, while the various routines may show a "start" and "end" block, the routines may be repeatedly performed in an iterative manner, for example.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an engine, comprising:
a cylinder;
a first injection subsystem for injecting a first substance into the cylinder;
a second injection subsystem for injecting a second substance into the cylinder; and
an electronic engine controller configured to control a plurality of operating parameters of the engine, where the electronic engine controller is configured to cause variation of at least one of the engine operating parameters in response to a shortfall condition of the second injection subsystem, the at least one engine operating parameter including at least one of spark timing, boosting, air-fuel ratio, and throttling.

2. The system of claim 1, where the electronic engine controller is configured to selectively and dynamically control quantities of the first substance and the second substance that are injected into the cylinder during combustion cycles of the engine, where such selective and dynamic control is based on operating conditions of the engine.

3. The system of claim 2, where the second substance is such that, for a combustion cycle of the engine, increasing a proportion of the second substance injected into the cylinder to the first substance injected into the cylinder reduces a tendency toward engine knock.

4. The system of claim 3, further comprising a sensor configured to detect the shortfall condition.

5. The system of claim 4, where the sensor is a level sensor configured to sense a quantity of the second substance available in the second fuel injection subsystem.

6. The system of claim 4, where the sensor is a pressure sensor configured to sense a pressure in the second injection subsystem.

7. The system of claim 4, where the sensor is a flow sensor configured to sense a flow rate of the second substance in the second injection subsystem.

8. The system of claim 4, where the sensor is a knock sensor.

9. The system of claim 3, where the shortfall condition includes at least one of: (a) a pressure in the second fuel injection subsystem being lower than a threshold; (b) a flow rate in the second fuel injection subsystem being lower than a threshold; (c) a quantity of the second substance available in the second injection subsystem being lower than a threshold; and (d) the second injection subsystem injecting less than a requested quantity of the second substance.

10. The system of claim 3, where the electronic engine controller is configured to cause a retardation of spark timing in response to the shortfall condition.

11. The system of claim 3, where the electronic engine controller is configured to cause an enrichment of an air-fuel ratio in the cylinder in response to the shortfall condition.

12. The system of claim 3, where the electronic engine controller is configured to cause a reduction in boost pressure in response to the shortfall condition.

13. The system of claim 3, where the electronic engine controller is configured to cause increased throttling of the engine in response to the shortfall condition.

14. A method of controlling operation of an engine, comprising:
injecting a first substance into a cylinder of the engine;
injecting a second substance into the cylinder, where injecting the first substance and the second substance is performed under control of an electronic engine controller to selectively control amounts of the first substance and the second substance that are injected into the cylinder during combustion cycles of the engine;
detecting a shortfall condition associated with injection of the second substance into the cylinder; and
varying an operating parameter of the engine in response to detection of the shortfall condition, where varying the operating parameter of the engine includes at least one of (a) retarding spark timing of the cylinder; (b) enriching an air-fuel ratio in the cylinder during one or more combustion cycles; (c) increasing throttling of airflow to the cylinder for one or more combustion cycles; and (d) reducing boost of the engine.

15. The method of claim 14, where the first substance is gasoline.

16. The method of claim 15, where the second substance is ethanol.

17. The method of claim 14, where the first substance is gasoline that is port-injected into the cylinder, and where the second substance is ethanol that is direct-injected into the cylinder.

18. The method of claim 14, where detecting the shortfall condition includes determining that an available quantity of the second substance has fallen below a threshold.

19. The method of claim 14, where detecting the shortfall condition includes determining that a pressure of the second substance has fallen below a threshold.

20. The method of claim 14, where detecting the shortfall condition includes determining that a flow rate of the second substance has fallen below a threshold.

21. The method of claim 14, where detecting the shortfall condition includes receiving indication of knock from a knock sensor of the engine.

22. A system for an engine, comprising:
a cylinder having a spark plug;
a turbocharger coupled to the engine to boost intake air delivered to the cylinder;
an electronic engine controller;
a fuel injection system configured to inject gasoline into the cylinder, and to directly inject ethanol into the cylinder, where ethanol injection quantity is controlled selectively by the electronic engine controller during combustion cycles of the engine to provide knock suppression; and
a sensor configured to detect a current or anticipated ethanol deficiency, where the electronic engine controller is configured to cause reduction of engine boosting and retardation of spark timing in response to detection of such current or anticipated ethanol deficiency.

23. The system of claim 22 where the sensor is a level sensor configured to sense a quantity of ethanol available in the fuel injection system.

24. The system of claim 22 where the sensor is a pressure sensor configured to sense a pressure of ethanol in the fuel injection system.

25. The system of claim 22, where the sensor is a flow sensor configured to sense a flow rate of ethanol in the fuel injection system.

26. The system of claim 22, where the sensor is a knock sensor.

27. The system of claim 22 further comprising adjusting a transmission gear ratio in response to the detection of such current or anticipated ethanol deficiency.

28. The system of claim 27, where the electronic engine controller is configured to vary the boosting and spark timing in response to detection of the current or anticipated ethanol deficiency so as to reduce a tendency toward knock in the cylinder.

* * * * *